March 14, 1961   D. D. M. STREED ET AL   2,974,373
HOLLOW MOLDED PLASTIC ARTICLES AND METHOD OF FORMING THE SAME
Filed Oct. 17, 1952   2 Sheets-Sheet 1
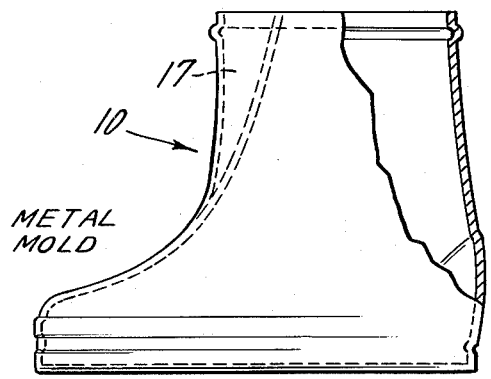
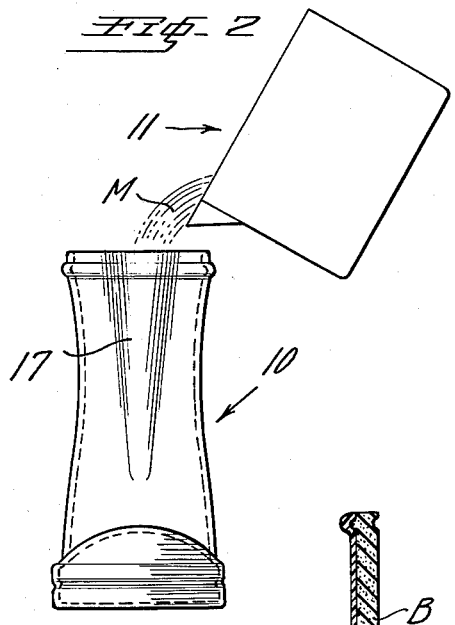
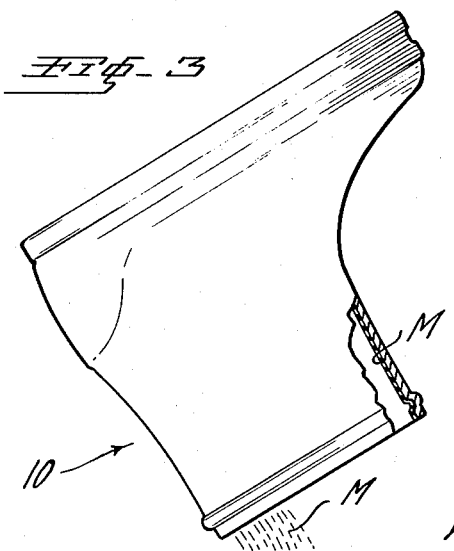
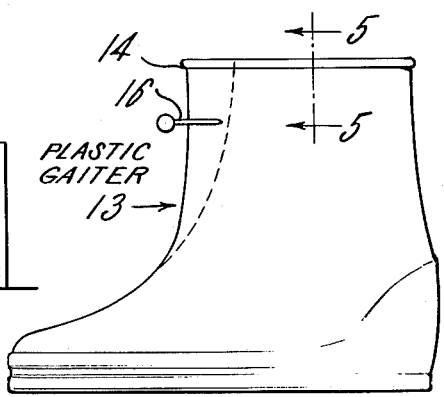
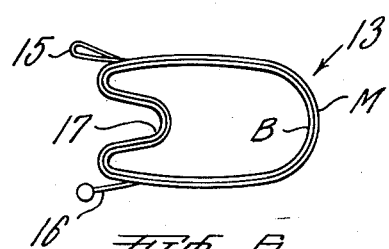
INVENTORS
DAVID D. M. STREED
EUGENE A. LUXENBERGER
BY
Charles C. Willson
ATTORNEY

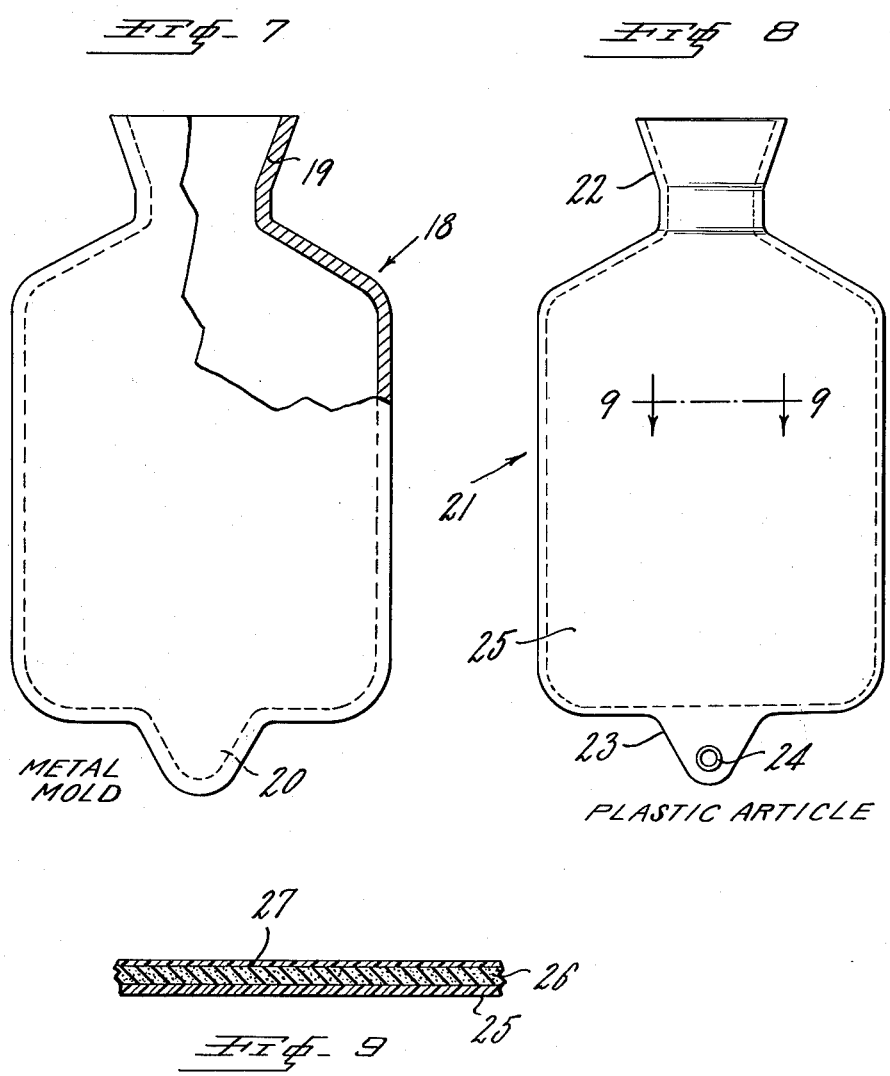

United States Patent Office 2,974,373
Patented Mar. 14, 1961

2,974,373

HOLLOW MOLDED PLASTIC ARTICLES AND METHOD OF FORMING THE SAME

David D. M. Streed, South Bend, and Eugene A. Luxenberger, Mishawaka, Ind., assignors to United States Rubber Company, New York, N.Y., a corporation of New Jersey Filed Oct. 17, 1952, Ser. No. 315,274

13 Claims. (Cl. 18—59)

The present invention relates to somewhat elastic hollow molded plastic articles, such as waterproof footwear having a warm cellular lining, and to the method of forming the same.

Rubber-like hollow articles such as thin plastic gaiters have been produced heretofore by the so-called "slush molding" method. In carrying out such method a hollow metal mold is used, which is heated before the plastic molding material is introduced therein, or the mold may be heated after the material has been introduced therein. The mold is filled completely or to the desired height with a creamy plastic material that is to produce the finished article, and the heat of the metal mold causes a layer of the plastic material that contacts the mold walls to deposit on these walls and adhere thereto. As soon as a deposit layer of the desired thickness has formed on the inner walls of the mold, the rest of the creamy plastic material is poured from the mold, whereupon the mold, heretofore, has been further heated to first gel and then fuse such layer to form a tough flexible rubbery article that has accurately imparted thereto the shape of the interior of the mold.

This molded article produced heretofore, because of its tough elastic properties, can be easily stripped from the mold as a finished article of manufacture, and due to its tough flexible properties it is not readily marred as it is removed from the mold or when in use. The plastic material used to produce such slush molded article is preferably a vinyl plastisol, prepared by dispersing finely divided polyvinyl resin powder in a liquid plasticizer therefor to form a creamy liquid. The preparation of plastisols and their use is well known by those skilled in the art, and are described in more detail in Modern Plastics 26, 78 (April 1949) by Perrone & Neuwirth.

The slush molding procedure used heretofore, as will be apparent from the foregoing, is easy and inexpensive to practice and produces seamless articles that conform accurately to the contour of the mold. Articles of footwear when made by such slush molding procedure are waterproof and inexpensive and are highly satisfactory when worn in mild weather, but when worn in cold weather are open to the objection that the resinous material has a relatively high thermal conductivity so that such footwear fails to keep the feet warm.

Having in mind this shortcoming of articles of footwear as made heretofore by the slush molding process, the present invention contemplates an important improvement whereby slush molded articles of footwear and other hollow molded articles may be provided with a cellular lining of plastic material, so that such article will have good thermal insulating properties, and footwear made in accordance with the present invention will be as warm or warmer than the well-known wool fleece lined rubber boots or gaiters.

This highly desirable thermal insulating property can be imparted to various hollow articles, in accordance with the present invention, by employing a heated hollow metal mold and slush molding therein a creamy resinous material, as above described, to deposit on the inner walls of the mold the outer wall of the article of footwear for example. The thickness of this deposit will increase with each second the creamy liquid remains in the hot mold. The excess creamy liquid is then emptied from this mold, and the deposit is heated to gel the resinous material without fusing the same. The mold is next refilled with a more or less similar plastic resinous material but which contains a blowing agent. The mold is then again emptied of the creamy resinous material that does not adhere to the previously deposited gelled skin.

The mold with the first or outer wall deposited therein and the second or inner wall deposited therein is now heated at a sufficiently high temperature and for a sufficient length of time to blow the inner layer and produce a cellular lining, and also to fuse both layers and bond them into a unitary structure. "Fusion" takes place when the temperature is raised above the softening point of the resin, at which temperature the solvent action of the plasticizer is increased to cause the resin and plasticizer to form a tough homogeneous resinous mass in which the powdered resin and the liquid plasticizer have coalesced to form a single phase. The terms, "fused" and "fusion," as used herein, denote heat treatment to produce this result. The fusion, which takes place during the final heating step, is absolutely essential to transform the gelled film, which is very weak and cheesy, into a tough leather-like homogeneous film. A six minute application of heat at 420° F. is found about right to effect fusion and blowing, although the temperature will vary with the resinous composition and the particular blowing agent employed. Generally a temperature above 200° F. is required.

In this manner a seamless article of footwear or other hollow article having a tough, durable outer wall and tough, durable cellular inner wall having good thermal insulating properties is produced. Such insulated article may comprise an article of wear, such as a glove or mitten, or a gaiter to be worn over the shoe or it may be made in the form of a warm boot or slipper to be worn in place of a shoe. The method of the present invention may also be employed to produce other hollow articles such as an insulated water-bottle or other insulated container.

The above and other features of the present invention will be further understood from the following description when read in connection with the accompanying drawings, wherein:

Fig. 1 is a side elevation with part broken away of a hollow metal mold used in slush molding a rubber-like flexible gaiter;

Fig. 2 is a front view of the mold of Fig. 1 showing a creamy resinous material being poured therein to produce the first or outer wall of the gaiter;

Fig. 3 shows the mold of Fig. 2 as turned upside down to pour therefrom the creamy material that does not adhere to the walls of the mold;

Fig. 4 is a side view of the finished molded gaiter having a smooth tough outer wall and a warm cellular lining;

Fig. 5 is a sectional view taken on the line 5—5 of Fig. 4;

Fig. 6 is a top plan view of the upper end portion of the gaiter of Fig. 4;

Fig. 7 is a side elevation with parts broken away of a metal mold for producing a hot-water bottle;

Fig. 8 is a side view of a hot-water bottle produced in the mold of Fig. 7; and

Fig. 9 is a section taken on the line 9—9 of Fig. 8.

The metal mold employed to carry out the present invention may be electroformed or otherwise made, but excellent results are secured by employing a sprayed metal mold produced by spraying hot molten aluminum onto a mold having the exact contour it is desired to impart to the finished slush molded article. The sprayed aluminum mold such as indicated by 10 in the first sheet of the drawings is preferably produced by having a designer make of wood or plastic a model having the size and contour to be imparted to the finished article of footwear. Then this artistic model is used to mold about the same a flexible shell, made from a low-temperature-setting elastomeric molding compound. This flexible shell is used as a female mold to produce any number of plaster molds upon which the metal is sprayed. The solid plaster mold, not shown, is sprayed with nylon to give it a smooth nylon surface ready for use in producing the sprayed metal mold such as indicated by 10. This metal mold is formed by spraying onto the nylon covered solid mold, an aluminum composition in a molten condition to build up the desired wall thickness around the nylon-covered mold. Such solid plaster mold is then destroyed and removed from the hollow metal mold, which now has the appearance shown in Fig. 1 of the drawing and is ready for use in slush molding hollow plastic articles.

In carrying out the method of the present invention the hollow metal mold 10 is heated until the metal attains a temperature of 165–185° F. This takes only a few minutes in an oven at 420° F. Then the creamy resinous material is poured in the mold, as for example, from a receptacle 11 as shown in Fig. 2, and the metal mold should be filled with the creamy resinous material M to a point slightly higher than the top of the desired footwear. While, in carrying out the present invention, it is considered desirable to heat the metal mold before the material M is poured therein, this is not essential since the mold may be heated after it has been filled with the material M. After the material in the mold has been in contact with the hot metal walls at a temperature of about 175° F. for a few seconds, the metal mold is emptied as shown in Fig. 3 to pour out into a receptacle 12 all of the material M that does not adhere as a weak skin to the metal walls of the mold. The thickness of the plastic material deposited increases in proportion to the time the material M is left in the hot mold. The creamy material M deposited upon the side and bottom walls of the mold cavity is now subjected to sufficient heat to gel it to a dry slightly tacky condition, but the heat and time of application of the same should not be sufficient to completely fuse the deposited resinous material that is to form the outer wall M of the finished gaiter. It has been found that to gel the deposited creamy resinous material to a solid without fusing it requires about 90 seconds in an oven at 420° F. The term "gelling" as herein used means that transition which takes place upon heating to convert the deposited heavy viscous plastisol liquid to a very cheesy solid, but not to the stage in which the plastisol particles are fused to a tough homogeneous translucent sheet.

To provide this gaiter with a cellular resinous lining having good thermal insulating properties, as contemplated by the present invention, the slush molding procedure is repeated substantially as above described, in that the hot metal mold 10 having deposited on its inner walls the gelled resinous skin or layer M, is now filled with a creamy resinous material which may be substantially the same as indicated by M, except that this second charge of creamy resinous material contains a blowing agent. After the hot mold 10, having its inner walls covered with the skin M as shown in Fig. 3, has been filled with a second resinous material to deposit therein a second creamy layer B containing a blowing agent, the mold is again promptly emptied.

The metal mold 10 now having deposited therein the first or outer gelled skin M of resinous material, and the second or inner layer B of resinous material containing the blowing agent, is heated to above 350° F. preferably 420° F. for a sufficient length of time, say five to ten minutes, to blow the plastic layer B to thereby produce a cellular lining having good thermal insulating properties. This application of heat should be continued until both layers are fused to a tough, durable rubber-like or leather condition and the two layers are integrally bonded together. It will be understood that the temperature required to fuse the resinous material will vary with the amount of plasticizer and the particular resin used in the resinous composition. The decomposition temperature of the blowing agent should match, as closely as possible, the fusion temperature of the resinous material. If the blowing agent decomposes before fusion begins, the film is not firm enough to contain the gas. In the gelled state the film permits the gas to permeate through to the surface.

After these layers M and B have been fused as just mentioned and the metal mold has been cooled to some extent, preferably below the softening point of the resinous material, the plastic article produced therein is stripped from the mold, whereupon it will appear substantially as shown in Fig. 4 and indicated by 13. Such article of footwear is seamless throughout and preferably has a smooth, tough, durable outer surface that presents in reverse the contour of the smooth finish of the inner walls of the metal mold 10. This article of footwear is preferably trimmed at its upper end above the bead 14 so as to give it a smooth upper edge, and it may be provided with a closure fastener such as indicated by the cord loop 15 and knotted cord 16 that serve to hold the folded front portion 17 of the gaiter contracted so that the article of footwear will fit snugly about the ankle. This completes the operation of forming the article of footwear shown on Sheet 1 of the drawings.

The material used to form the outer lining M and inner lining B of the article of footwear or other hollow article, is preferably what is known as a plastisol or vinyl plastisol which has been carefully formulated to impart to the same a viscosity such that it will take accurately the contour of the mold cavity and will produce an inner and outer resinous wall of the desired thickness under the used mold temperature, and will also have the desired stiffness, tear resisting strength, durability and color. The finished article is tough and durable and may be made in various colors, and the thickness of the walls M and B can be varied by varying the heat treatment and the viscosity of the plastisol, and the amount of blowing agent.

The formulation for the outer layer M is a plastisol such as follows:

Example

| | Parts by wt. |
|---|---|
| "Plastisol grade" polyvinyl chloride (Geon #121 or QYNV mfd. by B. F. Goodrich & Carbide & Carbon respectively) | 100 |
| Plasticizer: | |
| Dioctyl phthalate | 41 |
| Dioctyl adipate | 15 |
| Polyester resin plasticizer [of the type disclosed in Ind. Eng. Chem. 37, 504 (1945), e.g., "Paraplex G-60"] | 14 |
| Stabilizer (organic cadmium cpd.) | 3 |
| Coloring pigment | 1 |

The plasticizer, stabilizer and coloring pigment are preferably mixed together in a suitable container, then the resin is added slowly with high speed stirring. It is important to make sure that the resin already added is wet thoroughly before more resin is added, and the mix should be stirred until free of all lumps.

A hollow metal mold, the cavity of which has the shape of the desired footwear, is preferably preheated to about 175° F. and is then filled with the above mixture, and after about four seconds the mixture is poured out of the mold.

The resin mix that adheres to the hot walls of the molds forms the outer wall of the plastic article of footwear. This deposited coat is gelled in place by putting the mold in a heater at 420° F. for about 1½ minutes to form a weak cheesy slightly-tacky solid. A longer heat treatment will fuse the resin to a tough dry film and prevent adhesion of the subsequently applied coat.

The formulation for the inner layer may be the same as that given above for the outer layer, except that it has intimately admixed therewith the following ingredients which serve, respectively, as blowing agent and wetting agent.

"Unicel ND" (40% dinitrosopentamethylenetetramine and 60% inert material) _____ 5
Polyoxyethylene esters (Tween 85), Atlas Powder Co___ 2

These two ingredients are added to the mixture of the plasticizer, stabilizer and pigment before the resin is added. This mixture which is to form the inner lining of the footwear is poured into the hot mold so that it will deposit on the previously formed gelled wall, it is then promptly emptied from the mold. The mold is then placed in an oven which is at a temperature of 420° F. for about six minutes to blow the inner coating to form a cellular lining and to fuse the inner and outer walls and bond them together. Since it may be desirable to color the lining differently from the outer wall, the pigments may be different for these two walls.

The viscosity of the formulation at the time of pouring the inner and outer coating is important, in order to produce slush molded inner and outer walls of the desired thickness and which will accurately reproduce the contour of the metal walls in reverse. As is well known to those skilled in the art, the viscosity of plastisols can be controlled by proper choice and proportion of plasticizers and resins; also by the addition of the wetting agents. A viscosity of about 8000 centipoises at 80° F. is preferred for the outer layer M and a viscosity of about 2500 centipoises is preferred for the inner cellular layer B. The lower viscosity permits the compound to blow more readily. Other gas evolving chemicals can be used in place of the Unicel ND, e.g., Celogen (p,p'-oxy-bis-(benzene sulfonyl hydrazide)), Porofor N (azo isobutyric dinitrile), Unicel (diazoaminobenzene), sodium bicarbonate.

The present invention is well adapted for use in producing warm articles of wear such as footwear and gloves and mittens having a blown cellular insulated lining, as above mentioned, but it may also be employed to make flexible containers having thermally insulated walls. Examples of such insulated containers are hot-water bottles, and bag-like insulated food containers.

A hot-water bottle constructed in accordance with the present inventon is shown on Sheet 2 of the drawings and will now be described. Fig. 7 is a view of a metal mold 18 which is preferably formed of sprayed metal substantially as above described. This mold has the open neck portion 19 and the pocket 20 shaped to produce the usual projecting tab at the bottom of a hot-water bottle. Fig. 8 shows a hot-water bottle 21 after it has been formed in the mold 18 and removed therefrom. This bottle has the neck 22 and supporting tab 23 and the tab has secured therein the usual metal eyelet 24. The setting of the resin to form this tab may be effected by heating this portion of the mold to a higher temperature.

The insulating lining B of the gaiter 13 which is blown or cellular as above described is practically impervious to water, for if the gaiter 13 is placed for hours in a tub of water it will gain almost nothing in weight. This is due to the fact that the heat treatment forms a glazed surface at the inner face of the blown layer B. However in forming a liquid container, such as the hot-water bottle 21 it may be desirable to keep the contents of the bottle from contacting the cellular lining. Therefore the bottle 21 is preferably formed with the outer wall or skin 25, cellular lining 26 and inner wall or skin 27. The outer wall 25 and cellular lining 26 can be slush molded similar to the manner in which the outer wall M and lining B above described are formed and each is gelled but not fused. In order to produce the inner wall or skin 27 all that is necessary is to slush mold the same type of creamy resin that is used to form the wall 25 against the jelled blowable coating 26. Then the metal mold 18 having deposited therein the layers 25, 26 and 27 is heated sufficiently to fuse all the layers, to blow the layer 26, and to bond the layers 25 and 27 to the blown layer 26.

In carrying out the present invention the heat treatment used at each step is important. Such heat treatment is used to cause a desired thickness of the creamy plastic to be deposited on the mold walls, then further heat is used to gel this deposited layer before another layer is formed, and finally additional heat is used to blow one layer, fuse all layers, and bond them together.

Footwear or other hollow articles formed in accordance with the present invention will be seamless, tough and durable and will have good thermal insulating properties. They can be made at low cost with inexpensive equipment and very little labor, compared with that required to make the usual waterproof footwear on a conventional last. The blowing of the layer B or 26 takes place at atmospheric pressure, and not under pressure as is usual in producing blown rubber. This free blow produces a cellular material having both closed and open cells. The finished article of footwear or other article having a cellular lining is stiff enough to retain well its molded shape. This stiffness is due largely to the fact that the solid outer wall and blown inner wall are fused together throughout the article.

Having thus described our invention, what we claim and desire to protect by Letters Patent is:

1. The method of making a flexible seamless hollow article having a rubber-like resinous outer wall and an integral resinous thermally-insulated cellular lining, which comprises providing a hollow metal mold having a mold cavity of the shape to be imparted to said article, heating this mold and pouring a creamy vinyl plastisol into the hot mold and pouring out the plastisol that does not adhere as a skin to the mold walls, gelling said skin by heat, then pouring into the hot mold the walls of which are covered with said gelled skin a creamy vinyl plastisol containing a blowing agent and pouring out the plastisol that does not adhere to said skin, and then further heating the mold to blow the second plastisol layer and simultaneously fuse both layers and bond them integrally together.

2. The method of making a seamless hollow article having a rubber-like resinous outer wall and an integral resinous thermally-insulated cellular lining, which comprises providing a hollow metal mold having a mold cavity, coating the inner walls of the mold with a creamy plastisol and heating this coating to gel the same and form the outer wall of said article, covering this gelled plastisol coating of the mold with a creamy plastisol containing a blowing agent, and then heating the mold sufficiently to blow the second plastisol layer and form an impervious cellular lining and also fuse the outer wall and lining and bond them together.

3. The method of making a seamless hollow article having a rubber-like resinous outer wall and an integral resinous thermally-insulated cellular lining, which comprises providing a hollow metal mold having a mold cavity, slush molding a plastisol on the walls of said cavity, heating this deposited plastisol to gel the same and from the outer wall of said article, then slush molding a plastisol containing a blowing agent within the mold to form a deposit on said gelled walls, and heating the mold sufficiently to blow the second plastisol layer and form an impervious cellular lining and also fuse both walls and bond them together.

4. The method of making a seamless flexible hollow article having a water-impervious outer wall and an integral thermally-insulated cellular lining, which comprises providing a hollow metal mold having a mold cavity of the shape to be imparted to such article, pouring a creamy plastic of synthetic resin in the mold and pouring out that which does not adhere to the mold walls, heating this deposited resin to gel the same and form an outer wall, then pouring into the mold a creamy plastic of synthetic resin containing a blowing agent, pouring out of the mold the resin that does not adhere to the gelled plastic layer, and then heating the mold sufficiently to blow the second plastic layer to form a cellular lining and a water-impervious outer wall and bond them together.

5. The method of making a seamless flexible hollow article having a water-impervious outer wall and an integral thermally-insulated cellular lining, which comprises providing a hollow metal mold having a mold cavity of the shape to be imparted to such article, heating this mold, pouring a creamy plastic of synthetic resin in the mold and pouring out that which does not adhere to the hot mold walls, as soon as this deposited plastic has gelled pouring into the mold a creamy plastic of synthetic resin which contains a blowing agent and pouring out of the mold this resin that does not adhere to the gelled first plastic layer, and then heating the mold sufficiently to blow the second plastic layer and to fuse the two layers and bond them together.

6. The method of making a seamless article of footwear having a water-impervious outer wall and an integral thermally-insulated cellular lining, which comprises providing a hollow metal mold having a mold cavity, pouring a creamy plastic of polyvinyl chloride in the mold and pouring out that which does not adhere to the mold walls, heating this deposited resin to gel the same and form a water-impervious outer wall of the footwear, then pouring into the mold a creamy plastic of polyvinyl chloride containing a blowing agent, pouring out of the mold the resin that does not adhere to the gelled first layer, and then heating the mold sufficiently to blow the second plastic layer and fuse the two layers together.

7. A seamless rubber-like article of footwear, formed of a polyvinyl chloride resin slush molded to the shape of the article of footwear and having an impervious outer wall that has the reverse contour of the hollow mold in which it was molded, and an integral relatively rough inner wall formed of a slush molded and blown polyvinyl chloride resin integrally bonded to said outer wall and providing a thermally insulated lined article of footwear.

8. A seamless hollow flexible article, comprising an impervious and seamless fused outer wall formed from a dispersion of synthetic resin in plasticizer and having an outer surface accurately reproducing the surface contours of the mold in which the dispersion was molded, a fused freely blown cellular integral inner wall formed from a dispersion of synthetic resin in plasticizer intimately conforming to the inner surface configuration of said outer wall in which said latter dispersion was molded, said walls being fused integrally together, said inner wall providing a cellular thermally insulating lining for said article.

9. A seamless rubber-like hollow article of wear, comprising an impervious and seamless fused outer wall formed from a dispersion of vinyl resin in plasticizer and having an outer surface accurately reproducing the surface contours of the mold in which the dispersion was molded, a fused freely blown cellular integral seamless inner wall formed from a dispersion of vinyl resin in plasticizer intimately conforming to the inner surface configuration of said outer wall in which said latter dispersion was molded, said walls being fused integrally together, said inner wall providing a cellular thermally insulating lining for said article.

10. A seamless rubber-like hollow article of wear comprising an impervious and a seamless fused outer wall formed from a dispersion of vinyl resin in plasticizer and having an outer surface accurately reproducing the surface contours of the mold in which the dispersion was molded, an integral seamless fused freely blown cellular inner wall formed from a dispersion of vinyl resin in plasticizer intimately conforming to the inner surface configuration of said outer wall in which said latter dispersion was molded, said walls having been fused integrally together simultaneously with the blowing of said inner wall, whereby a unitary seamless, water impervious and thermally insulated article of wear is provided.

11. A seamless rubber-like hollow article of footwear, comprising an impervious and seamless fused outer wall formed from a plastisol of vinyl resin having an outer surface accurately reproducing the surface contours of the mold in which the plastisol was molded, an integral seamless fused freely blow cellular inner wall formed from a plastisol of vinyl resin intimately conforming to the inner surface configurations of said outer wall in which said latter plastisol was molded, said walls being fused integrally together, said inner wall providing a cellular thermally insulating lining for said article of footwear.

12. The method of making a seamless flexible hollow article of footwear having a water impervious outer wall and an integral thermally insulating cellular lining, which comprises providing a hollow metal mold having a mold cavity of the shape to be imparted to the article of footwear, coating the inner walls of the mold with a creamy vinyl resin dispersion, heating this coating to gel the same and form a water impervious outer wall of the footwear, covering this gelled coating of the mold with a creamy vinyl resin dispersion containing a blowing agent, and then heating the coatings of vinyl resin dispersion sufficiently to blow the second layer and form a cellular lining and also to fuse the outer wall and lining and bond them together.

13. The method of making an article having a resinous outer wall and an integral resinous cellular interior, which comprises providing a hollow metal mold having a mold cavity, coating the inner walls of the mold with a plastisol and heating this coating to gel the same and form the outer wall of said article, covering this gelled plastisol coating of the mold with a plastisol containing a blowing agent, and then heating the mold sufficiently to blow the second plastisol layer and form a cellular interior and also fuse the outer wall and interior and bond them together.

References Cited in the file of this patent

UNITED STATES PATENTS

| | | |
|---|---|---|
| 1,924,716 | Ferrettie | Aug. 29, 1933 |
| 2,256,329 | Szerenyi et al. | Sept. 16, 1941 |
| 2,304,717 | Swart | Dec. 8, 1942 |
| 2,394,327 | Niessen et al. | Feb. 5, 1946 |
| 2,445,732 | Carter | July 20, 1948 |
| 2,525,965 | Smith | Oct. 17, 1950 |
| 2,588,571 | Porter | Mar. 11, 1952 |

FOREIGN PATENTS

| | | |
|---|---|---|
| 500,298 | Great Britain | Feb. 7, 1939 |
| 600,270 | Great Britain | Apr. 5, 1948 |

OTHER REFERENCES

Baird: "P.V.C. Paste," British Plastics, April 1948, pages 167–171.